J. KISSEL.
Punching and Shearing-Machines.
No. 143,985.          Patented Oct. 28, 1873.
*Figure, 1.*
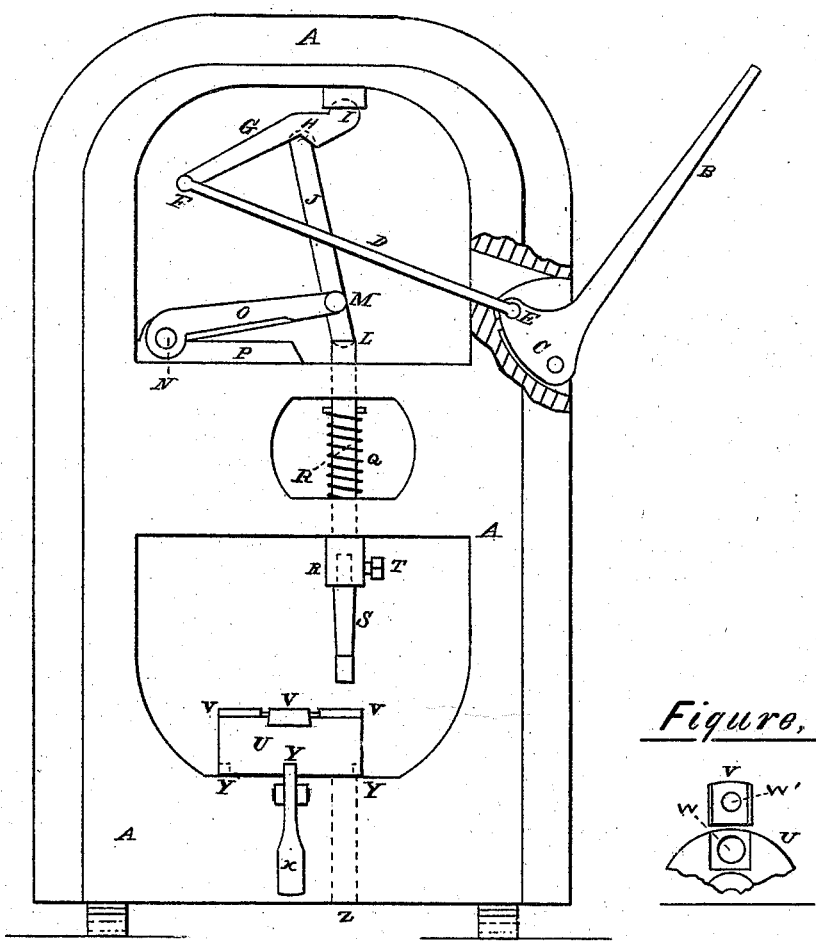
*Figure, 2.*
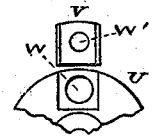
Witnesses.          Inventor.
A. H. Blankman          Jacob Kissel
J. B. McIntosh
AM. PHOTO-LITHOGRAPHIC CO. N.Y. (OSBORNE'S PROCESS)

UNITED STATES PATENT OFFICE.

JACOB KISSEL, OF CASSOPOLIS, MICHIGAN.

IMPROVEMENT IN PUNCHING AND SHEARING MACHINES.

Specification forming part of Letters Patent No. 143,985, dated October 28, 1873; application filed July 18, 1873.

*To all whom it may concern:*

Be it known that I, JACOB KISSEL, of Cassopolis, Cass county, Michigan, have invented certain Improvements in Punching and Shearing Machines, of which the following is a specification:

My invention consists in a combination of levers for operating a punching and shearing machine, as will hereinafter be more fully described.

Figure 1 is a side elevation of a machine embodying my invention. Fig. 2 is a segment of the chuck or bed for female dies.

A is the frame of the machine, to be constructed of iron, and of ample strength to resist the force required to perform the operation of shearing or punching metals. B is the actuating knee-lever, having its fulcrum at C. D is a link or connecting rod from the short arm E of knee-lever B to F end of lever G. G is a lever, having a socket-bearing or fulcrum at I, and gives off the power at H, the head of the piston J. Piston J is fitted as a hemisphere at both ends H L, and works in corresponding sockets in lever G at H, and the end of spindle R at L. O is a movable shear-blade, with its fulcrum or working pin at N, and receives its power from piston J through the coupling M; P, fixed shear-blade; R, vertical reciprocating spindle, in one end of which is fitted various-sized punches, of which S represents one. One punch at a time, of the size desired, is secured in said spindle R by set-screw T. Spindle R receives its power or end thrust from the piston J through the connection at L. The coil-spring Q is threaded by spindle R, and serves to return the said spindle to its resting position after having been put through the operation of punching. U, circular chuck or bed, in which dies V are fitted adjustably. The number of dies for which the chuck is designed is limited only by the size of dies required to do the desired work. X is a latch, working in stops or frets Y in the periphery of chuck U, to retain said chuck in position, when a die, V, is adjusted for punching; Z, way for the escape of waste metal punched out. V, Fig. 2, is a female die withdrawn to show the manner of adjustment in the chuck or bed U; W', hole in female die V, that may be made round, or of any other figure corresponding with the hole desired to be punched; W, hole through chuck U, for the same purpose as Z, and to coincide with it (Z) when in use.

The metal to be sheared or cut is placed between the shear-blades O P; then force applied to lever B, by the use of connecting-rod D, brings lever G to an upright position, at the same time forcing piston J endwise from H, and at the same time, through the coupling M with said piston J, motion and power are given to shear-blade O. Thus the operation of shearing or cutting is performed.

To punch, the metal is placed on one of the dies V under the punch S; and the same operation of the levers as in the act of shearing or cutting performs the work of punching.

I claim as my invention—

1. The combination of the lever B, coupling or connection D, lever G, link J, and rod R, with the frame of the machine and the punch, as shown and described.

2. The link or rod J, operated by the lever G, connection D, and lever B, in combination with the shears O P, as shown and described.

JACOB KISSEL.

Witnesses:
A. H. BLANKMAN,
J. B. McINTOSH.